United States Patent Office 3,667,870
Patented June 6, 1972

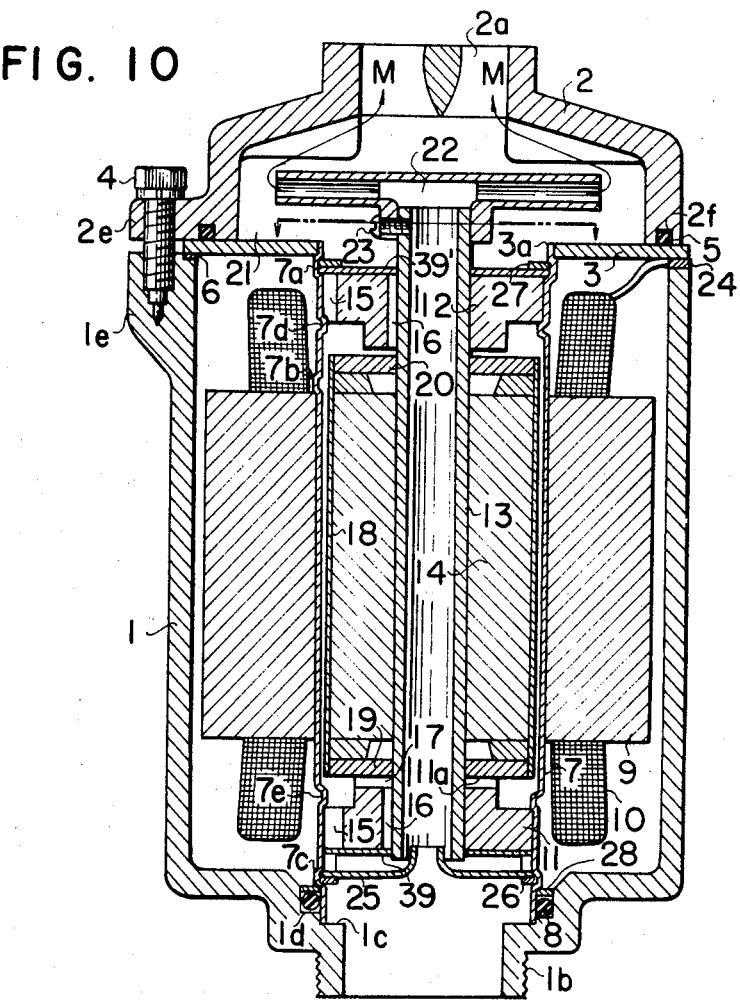
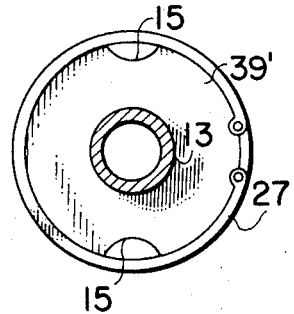
FIG. 10
FIG. 11

3,667,870
MOTOR DRIVEN PUMP
Yuji Yoshida, Neyagawa, and Noriyosi Asada and Takao Funatsu, Hirakata-shi, Japan, assignors to Matsushita Electric Industrial Co., Ltd., Osaka, Japan
Filed Jan. 4, 1971, Ser. No. 103,368
Claims priority, application Japan, Jan. 9, 1970, 45/3,059; Feb. 19, 1970, 45/14,674, 45/14,675, 45/14,676, 45/14,678, 45/14,679, 45/14,681, 45/14,682
Int. Cl. F04b *17/00, 35/04;* H02k *1/32, 9/00*
U.S. Cl. 417—357    12 Claims

ABSTRACT OF THE DISCLOSURE

A motor driven pump comprising a stator chamber and a rotor chamber separated from each other by means of a cylindrical sleeve, a hollow rotor shaft carried by a bearing block fixed in said cylindrical sleeve, and a pump impeller secured to the tip end of said hollow rotor shaft, the hollow interior of said rotor being communicating with main liquid flow.

BACKGROUND OF THE INVENTION

Hithertofore, as a kind of motor driven pump, it has been known to drive a conventional volute pump by a motor. However, in such a volute pump, since liquid is drawn into the pump at the central part of a pump impeller and discharged in a radial direction utilizing the centrifugal force thereof, there has been inherent structural requirement in that the pump impeller must be manufactured with severe tolerance with respect to a pump casing or liner. Any variation in the relative dimensions of the pump impeller and the pump casing unavoidably resulted in variation of pump performance.

Further, in such a pump, when bearing parts are lubricated by liquid to be pumped, there has been a problem of metal wear of bearings since the bearings are often operated under a dried condition due to the existence of air accumulated in conduits, separated from the liquid or drawn into the liquid through cavitation, and allowed to circulate in the conduits as a mixture with the liquid. Moreover, when any foreign material is contained in the intake liquid, it will also cause a problem of bearing wear.

In a canned type pump in which liquid within conduits is introduced into a rotor chamber, foreign materials in conduits will cause not only bearing wear but also binding of rotor. Further, in a conventional canned type pump-motor which often utilizes a stainless steel or the like to form parts that come into contact with liquid to be pumped, the life of the pump is substantially reduced due to a particular corrosion inherent to the stainless steel.

Further, a conventional motor driven pump is disadvantageous in that liquid flow is often accompanied with whirling and/or turbulences which cause increased noise.

SUMMARY OF THE INVENTION

The present invention eliminates the aforementioned disadvantages of the conventional motor driven pumps.

According to the present invention, a motor driven pump comprises a cylindrical sleeve, a stator core fixed on the outer peripheral surface of the cylindrical sleeve, a bearing block fixed on the inner peripheral surface of the cylindrical sleeve, a hollow rotor shaft supported by the bearing block and having a pump impeller secured at the discharge end thereof, the hollow interior of said rotor shaft providing a main flow passage of liquid.

The first object of the present invention is to provide a motor driven pump having less number of components, simple to assemble, easy to control the assembling tolerance and suitable to mass production.

Another object of the present invention is to prevent air from accumulating in a pump to avoid operating bearings under a dried condition due to the air mingled in the liquid, so that the life of the pump is greatly increased.

A further object of the present invention is to obtain a safer motor driven pump by increasing reliability of electrical insulation.

Still further object of the present invention is to provide a motor driven pump in which liquid can be discharged in a direction either parallel or perpendicular to the motor axis and in which noise during pumping operation can be remarkably reduced.

A further object of the present invention is to increase the life of a pump by shielding foreign materials in conduits to prevent any adverse effects of the foreign materials.

Still another object of the present invention is to obtain a motor driven pump which can be used for various applications by providing a water resistant motor stator so that it can be used in outdoors or even in water.

A further object of the present invention is to increase the life of a motor driven pump by providing a consumable anode in a liquid flow passage thereof.

A further object of the present invention is to obtain a motor driven pump which can be used even with a corrosive solution by sealing the rotor of the motor.

BRIEF DESCRIPTION OF THE DRAWINGS

FIG. 10 is a longitudinal view of a motor driven pump showing another embodiment of the present invention;

FIG. 11 is a sectional view taken along the line A–A' in FIG. 10; and

DESCRIPTION OF THE PREFERRED EMBODIMENTS

The present invention will now be described with reference to the embodiments illustrated in the accompanying drawings.

Figure 1:
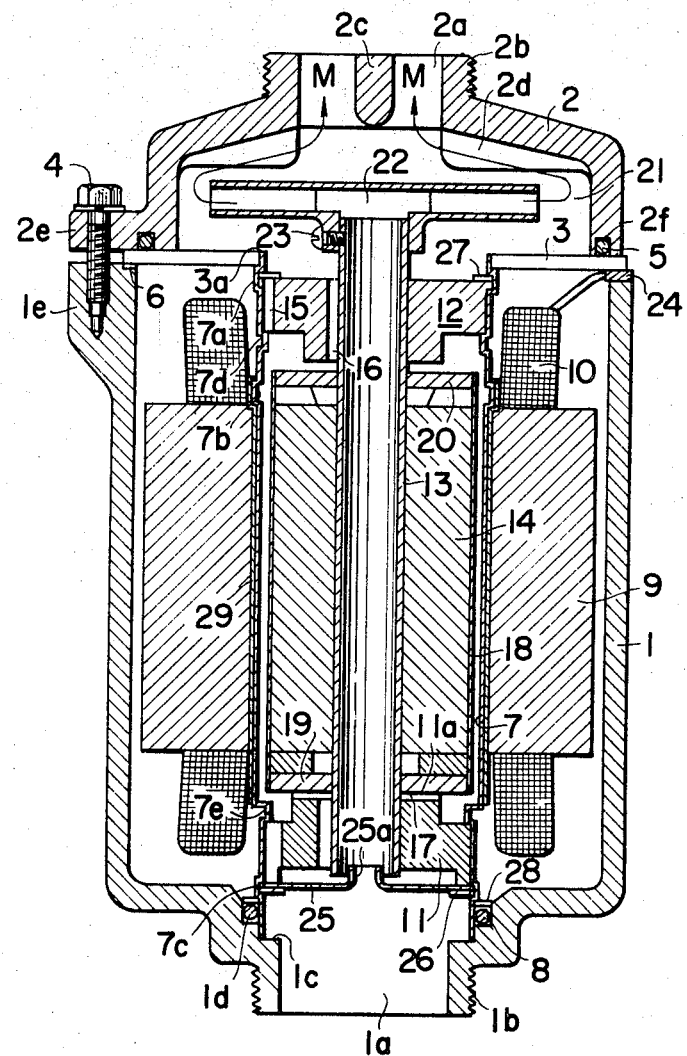
FIG. 1 is a longitudinal sectional view showing one embodiment of the motor driven pump in accordance with the present invention.
Figure 2:
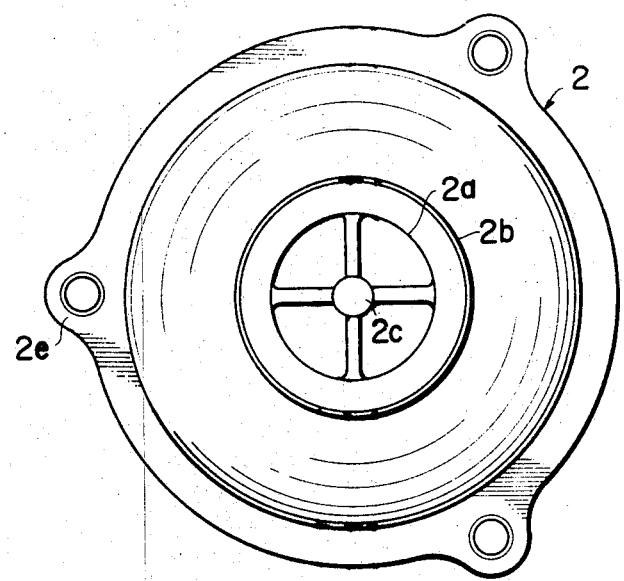
FIG. 2 is a plan view of the motor driven pump shown in FIG. 1 as seen from the discharge side.
Figure 3:
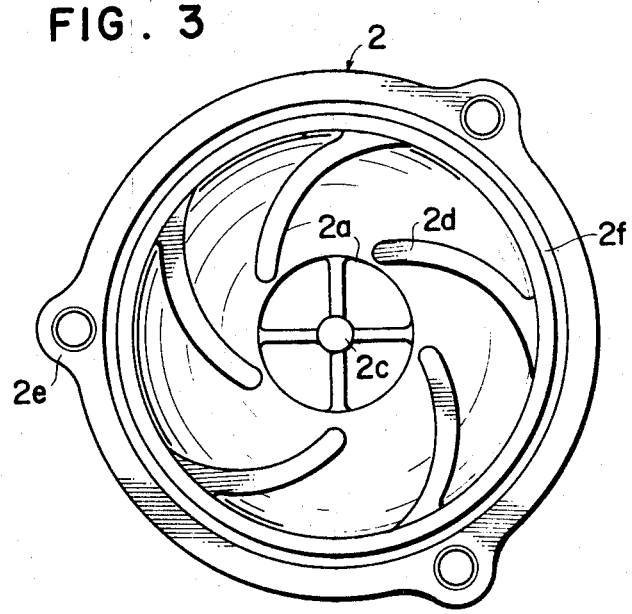
FIG. 3 is a rear view of a pump casing used in the motor driven pump.

Referring to FIGS. 1, 2 and 3, the reference numeral 1 shows a motor casing having an intake port 1a opening at one end thereof, with the other side wide open. Around the intake port 1a, there are provided a connection 1b for an intake conduit and shoulder portions 1c and 1d.

The reference numeral 2 shows a pump casing having an discharge port 2a formed at the central part of its one end and a discharge pipe connection 2b formed around the outer periphery of the discharge port 2a. A suitable number of radially extending adjusting vanes 2c are provided within the discharge port 2a and a suitable number of pump guide vanes 2d are provided at the inner wall surface of the same end so as to direct liquid toward said discharge port 2a. The other end of the casing 2 is widely opened.

The reference numeral 3 shows an end plate having an opening 3a formed at the center thereof. The end plate 3 is water-tightly secured between the motor casing 1 and the pump casing 2 by means of bolts 4 passing through an outwardly extending flange 1e of the motor casing 1 and the outwardly extending flange 2e of the pump casing 2.

In order to provide a water-tight connection between the end plate 3 and the pump casing 2, the pump casing 2 is provided with an annular groove 2f in the end face for receiving an O-ring 5. The O-ring 5 is maintained in contact with the end plate 3.

In order to assure the water-tightness between the end plate 3 and the motor casing 1, a packing 6 is disposed therebetween.

The reference numeral 7 shows a cylindrical sleeve which at one end is water-tightly welded to the periphery of the opening 3a of the end plate 3 and at the other end abuts on the shoulder portion 1c of the motor casing 1. An O-ring 8 is provided at this abutting portion so as to form a water-tight structure. The sleeve 7 is provided with outwardly projecting edges 7a, 7b and 7c and inwardly projecting edges 7d and 7e which are formed by bulging for instance.

The reference numeral 9 shows a stator core of the motor, 10 shows a stator coil wound around the stator core 9. Of course, the stator core 9 and the coil 10 are insulated from each other. Further, the stator core 9 is secured on the outer surface of the sleeve 7 with the intervention of an electric insulating layer 29. Thus, the stator core 9 is supported by the sleeve 7 and determined its position by means of the outwardly projecting edge 7b engaging the adjacent end face of the stator core 9. The insulating layer 29 is formed between the outer surface of the sleeve 7 and the inner surface of the stator core 9 by a heat resistant material of a thickness of the order of ten microns. The insulating layer 29 serves to integrally secure the stator core 9 and the sleeve 7 together. The insulating layer 29 may be formed by winding a thin tape of a suitable heat resistant material around the outer surface of the sleeve 7, and the stator core 9 may be secured to the insulating layer by a suitable adhesive agent. In order to prevent the motor from being lowered its performance, due to the increase in gap, the insulating layer 29 should preferably be as thin as possible and should also preferably have a sufficient voltage resistance.

The pump casing 2, the end plate 3 and the sleeve 7 are made of a suitable material having a high corrosion resistance to the liquid which is to be passed through the pump. The sleeve 7 is made of a suitable non-magnetic material and, through experiments, it has been found that a stainless steel is preferred.

The reference numerals 11 and 12 show bearing blocks, 13 a hollow rotor shaft supported by the bearing blocks 11 and 12. A rotor core 14 is secured to the hollow rotor shaft 13.

The bearing blocks 11 and 12 are supported by the sleeve 7 by being fitted in the inner surface of the sleeve 7 at the opposite ends thereof. Each of the bearing blocks 11 and 12 is provided, at a portion where it contacts with the sleeve 7, with one or more grooves 15 for passing the liquid and, at another portion where it contacts with the hollow rotor shaft 13, with one or more straight or spiral grooves 16 for passing the liquid. Further, the bearing block 11 is provided on its end face 11a with a plurality of radial grooves 17 for passing the liquid. The bearing blocks 11 and 12 may be made from any suitable material, and preferably from graphite or bronze since the blocks are lubricated by the liquid which is to be passed through the pump.

The rotor core 14 is sealed by a cylindrical outer enclosure 18 and end plates 19 and 20. The outer enclosure 18 and the end plates 19 and 20 are welded together, and the end plates 19 and 20 are secured to the hollow rotor shaft 13 by means of shrinking or cementing. The end plate 19 serves as a thrust disc for the end face 11a of the bearing block 11. The outer enclosure 18, the end plates 19 and 20 are made of good corrosion resistant metallic material. One end of the hollow rotor shaft 13 projects into a pump chamber 21 enclosed by the pump casing 2, the end plate 3 and the bearing block 12, and has a pump impeller 22 secured to said end by means of bolts 23. The reference numeral 24 shows an electric lead wire connected to the stator coil 10 and extending outwardly from the motor casing 1. Electric power is supplied through the wire 24 to the stator coil 10. The outer terminal of the wire 24 is water tightly sealed. The reference numeral 25 shows a circular foreign material shield plate having a central projection 25a which is provided with a central opening. The shield plate 25 is disposed between the intake port 1a of the motor casing 1 and the intake side of the hollow rotor shaft 13 and, in the illustrated embodiment, it is inserted into the sleeve 7 and secured in that position by the adjacent end face of the bearing block 11 and a retaining ring 26 which will be explained later. The outer diameter of said projection 25a of the shield plate is smaller than the inner diameter of the hollow rotor shaft 13, so that a portion of the projection 25a is received in the hollow rotor shaft 13 with a clearance.

The sleeve 7 having one end secured to the end plate 3 thus supports the stator core 9 and the bearing blocks 11 and 12, and they are assembled integrally with the rotor core 14, the pump impeller 22 and the shield plate 25. Particularly, the bearing block 11 is secured between the inwardly projecting edge 7e of the sleeve 7 and the retaining ring 26 inserted into an inner groove in the outwardly projecting edge 7c of the sleeve 7 with the intervention of the shield plate 25, while the bearing block 12 is secured between the projecting edge 7d of the sleeve 7 and a retaining ring 27 inserted into an inner groove formed in the projecting edge 7a.

The reference numeral 28 shows an O-ring retaining plate held by the projecting edge 7c of the sleeve 7. When the end plate 3 is held between the flange 1e of the motor casing 1 and the flange 2e of the pump casing 2, one end of the sleeve 7 abuts on the shoulder portion 1c of the motor casing 1, whereby the O-ring 8 is retained in a space enclosed by the shoulder portion 1d of the motor casing 1, said end portion of the sleeve 7 and the O-ring retaining plate 28 so as to water tightly seal the connection between the motor casing 1 and the sleeve 7.

In operation, when electric power is supplied through the wire 24 to the stator coil 10, the pump impeller 22 is rotated together with the rotor and liquid is guided by the shield plate 25 and drawn through the central opening in the projection 25a into the hollow interior of the rotor shaft 13. Then the liquid is propelled by the pump impeller 22 and directed toward the discharge port 2a along the guide vanes 2d provided in the pump casing 2 as shown by the arrows M. Thereafter, the liquid is rectified by the vanes 2c and discharged from the pump.

A portion of the liquid forced by the pump impeller 22 is passed through the grooves 15 and 16 in the bearing block 12 and the clearance between the bearing block 12 and the hollow rotor shaft 13 into the clearance between the sleeve 7 and the enclosure 18, and further through the grooves 17 in the bearing block 11 and the clearance between the bearing block 11 and the hollow rotor shaft 13, or through the groove 15 of the bearing 11 into the intake end of the hollow rotor shaft 13 to be taken into the hollow interior of the shaft 13 and recirculated therein. Thus, the bearings are lubricated by the liquid passing through the clearances between the hollow rotor shaft 13 and the bearing blocks 11 and 12.

According to the above described motor driven pump of the present invention, the rotor of the motor and the pump impeller connected thereto are supported by a sleeve through bearing blocks and the stator of the motor is also secured to the sleeve so as to form an integral assembly which is enclosed by a motor casing. Thus, the motor driven pump can be constituted only by the assembly, the motor casing and a pump casing. This arrangement minimizes the number of components of the device and makes it easy to assemble. The sleeve can be easily manufactured in a mass production line such as by bulging process with a high precision. Further, in this arrangement, since bearing blocks are held in the sleeve, the blocks can easily be aligned precisely with respect to the rotor and the pump impeller and the pump casing or liner shall not necessarily be precisely manufactured with respect to each other as required in a conventional pump. Thus, a relatively large tolerance of the relative dimensions of the pump impeller and the pump casing or liner is permitted without affecting on the performance of the pump.

Further, in a motor driven pump made in accordance with the present invention, liquid is passed through the hollow interior of a hollow rotor shaft and most of the liquid is directed toward discharge port by means of an impeller, the remaining part of the liquid being recirculated through bearing blocks into the intake end of the hollow shaft, so that air entrapped or drawn in the interior of the pump casing or around the motor rotor is exhausted during operation of the pump. Thus, according to the present invention, it is possible to avoid any accident caused by the entrapped air as has been encountered in a conventional pump. In this manner, the present invention is effective to prevent the pump from being operated under a dried condition and effectively increases the life of the pump.

Still further, in the motor driven pump in accordance with the present invention, since a shield plate is provided at the intake end of the sleeve, the intake liquid is smoothly guided by the shield plate into the hollow rotor shaft and prevented from directly flowing into the bearing blocks. Thus, even if there are foreign materials in the liquid, they are interrupted from entering the bearing blocks so that the bearing blocks become free from wear. Further, the foreign materials are also prevented from entering the clearance between the sleeve and the rotor, so that any problem of rotor sticking can be avoided.

Further, according to the present invention, although the motor driven pump is so constructed that a portion of liquid flowing in the hollow rotor shaft of the motor is recirculated from the exit end through bearing blocks and the rotor chamber into the intake end, the rotor core is sealed by end plates and an enclosure, so that it is free from being exposed to the liquid. Thus, any problem of rotor corrosion which may reduce the life of the pump can be eliminated. Therefore, the pump can be used with any corrosive solution.

It should also be noted that, in accordance with the present invention, the motor driven pump is provided with a water tight stator chamber by a motor casing, a sleeve and end plates for housing a stator core and a stator coil, so that it can be used in outdoors or even in water. Thus, the motor driven pump of the present invention can be used in many ways.

Further, in the motor driven pump in accordance with the present invention, liquid is directed by guide vanes provided in the pump casing in a direction parallel to the rotor shaft and the liquid flow is made smooth by the guide vane and adjusting vanes provided in the discharge end. Thus, the pump is free from swirl or turbulent flow and noise can remarkably be reduced. Therefore, the pump can be used even in a room as a circulation pump.

Moreover, in the motor driven pump in accordance with the present invention, the stator core of the motor is supported by a sleeve leaving a sufficient clearance between the motor casing and the stator core and an electric insulating layer is disposed between the sleeve and the stator core. Thus, a double insulation is provided between the motor casing, the sleeve and the stator coil by the insulation layer and the insulation of the coil itself. This arrangement enhances a safe operation of the pump in that, even when the insulation of the stator coil itself is broken, electric current is prevented from leaking toward the motor casing and pump conduits.

Figure 4:
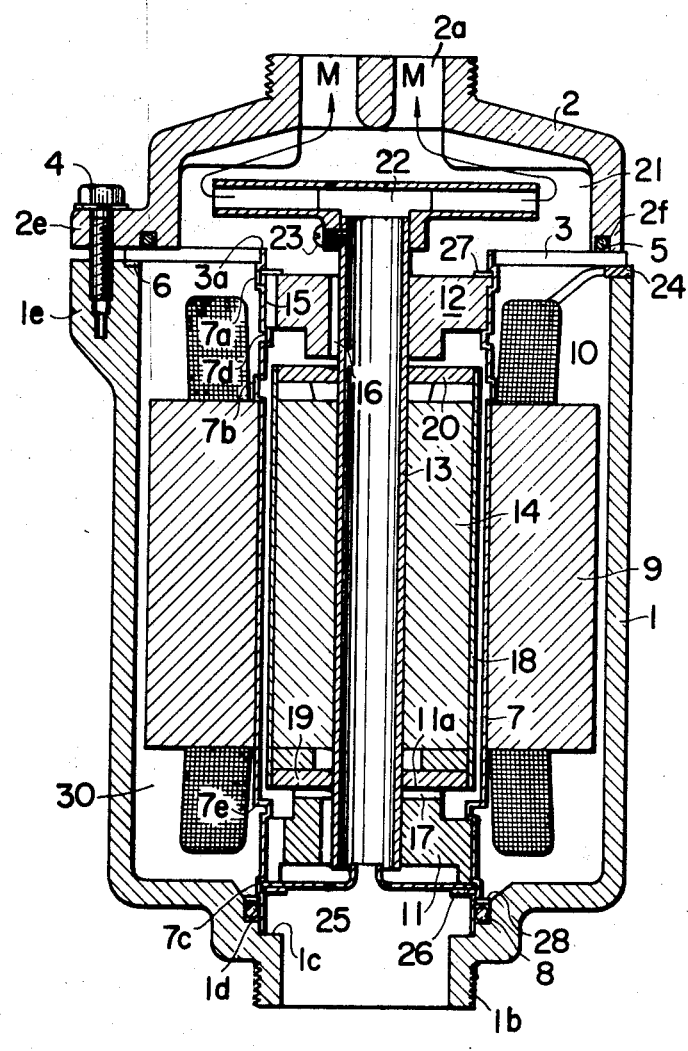
FIG. 4 is a longitudinal sectional view showing another embodiment of the motor driven pump in accordance with the present invention.

FIG. 4 shows another embodiment of the present invention. In this figure, the same reference numerals indicate the corresponding parts. The reference numeral 30 shows a water resistant resin molded around a stator core 9 and a stator coil 10 wound around the stator core 9. Thus, the stator core 9 and the stator coil 10 are of a water resistant structure and the pump can be made suitable not only for indoor use but also for outdoor and for underwater use. Therefore, the pump can have a wide utility. For example, the motor driven pump illustrated in FIG. 4 can be soaked in hot water in a boiler, so that it is not necessary to connect the pump in a conduit and that, since pump noise can be reduced, the boiler can be positioned in a room.

Figure 5:
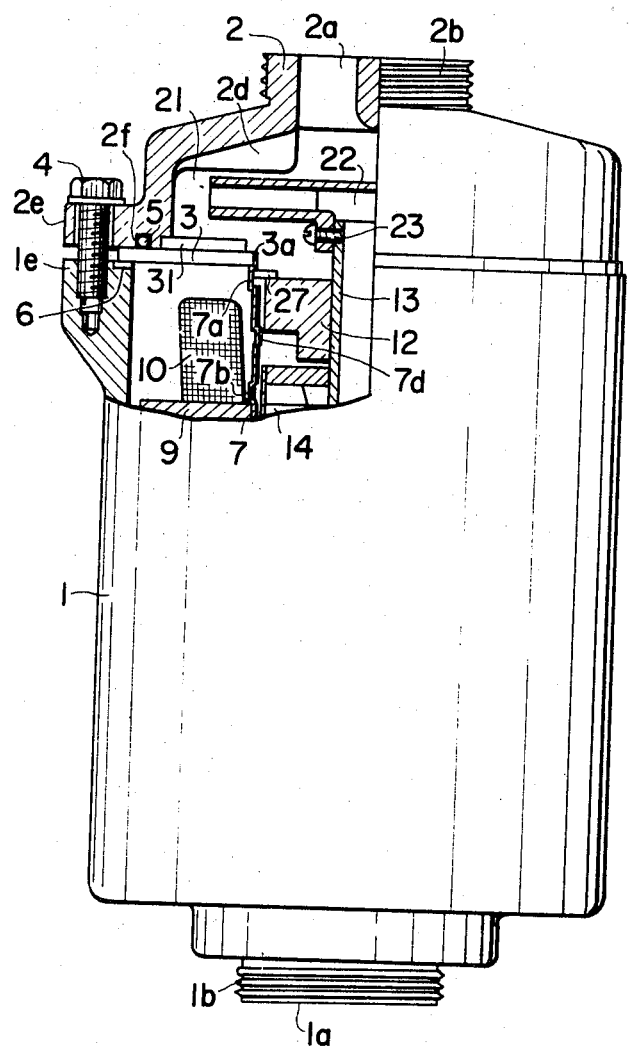
FIG. 5 is a side view of a still another embodiment of the motor driven pump in accordance with the present invention, a portion of the pump being broken away to show the interior thereof.

FIG. 5 shows a further embodiment of the present invention. In this figure, the reference numeral 31 is a consumable electrode made of a base metal such as magnesium and secured to an end plate 3 in the pump chamber 21. Alternatively, the consumable electrode 31 may be secured to another metallic member such as a sleeve 7 provided in the rotor chamber. Since conventional canned type motor-pumps have generally been made of materials such as stainless steel, they have been subjected to corrosions inherent to stainless steel, such as stress corrosion and interparticle corrosion, etc. Thus, conventional motor-pumps have substantially been reduced in their life when corrosive liquid is pumped. Particularly, in such a structure that has a stator chamber and a rotor chamber which are separated from each other as in the present invention, a partition plate which corresponds to the sleeve 7 referred to above is made of a thin walled pipe, so that it will easily be corroded throughout its whole thickness with the result that liquid in the rotor chamber is allowed to enter the stator chamber and deteriorates insulation. However, by providing a consumable electrode 31 as in the illustrated embodiment, other metallic components are prevented from being subjected to corrosion until the electrode 31 is completely consumed. Thus, the life of the pump can be increased. In this manner, it becomes possible to use the pump even with a corrosive liquid and the pump can have a wide utility.

Figure 6:
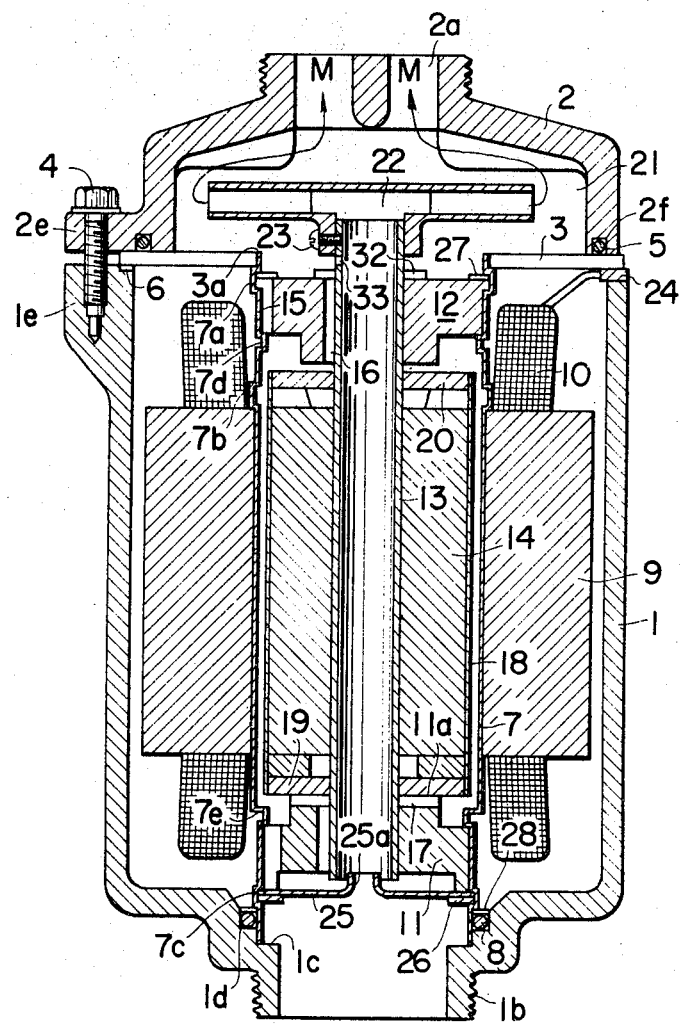
FIG. 6 is a longitudinal sectional view of a motor driven pump showing a still further embodiment of the present invention.

FIG. 6 shows a further embodiment of the present invention, in which the reference numeral 32 shows a slidable disc secured to a hollow rotor shaft 13. One end face of the slidable disc 32 and the end face of a bearing block 12 adjacent to a pump impeller 22 are so arranged as to be subjected to a thrust load, so that the disc is slidably rotated on the bearing block. The reference numeral 33 shows a hole which is formed through the wall of the hollow rotor shaft 13 at a position displaced somewhat toward the pump impeller 22 from the position where the slidable disc 32 is mounted. Thus, the end face of the bearing block 12 and the end face of the slidable disc 32 are slidably rotated with respect to each other so as to act as a mechanical seal, so that any foreign material that may exist in the liquid to be pumped is prevented from entering the rotor chamber or the gap between the bearing block 12 and the hollow rotor shaft 13. Therefore, according to the present invention, the pump becomes free from any problem of bearing wear or rotor sticking due to the existence of foreign materials as has been encountered in a conventional canned type pump. Further, since a constant liquid circulation is maintained in the pump chamber 21 through the hole 33, any foreign material that may exist in the liquid to be pumped will not be trapped in the pump chamber 21.

Figure 7:
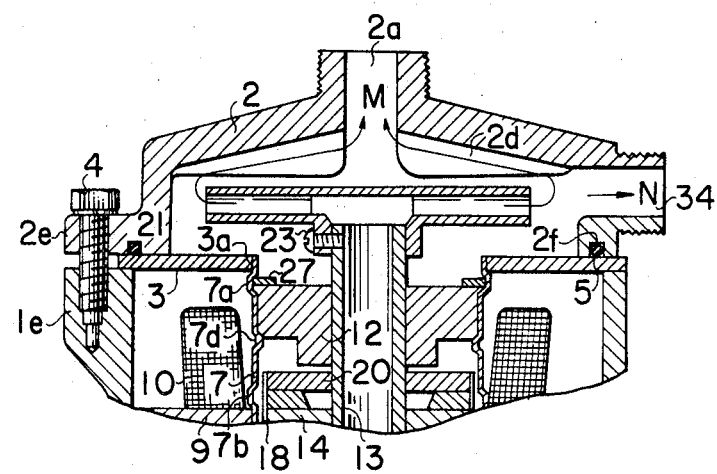
FIG. 7 is a fragmentary sectional view showing a motor driven pump in accordance with another embodiment of the present invention.

FIG. 7 shows a still further embodiment of the present invention, in which the pump casing 2 is provided on its outer surface with a radially extending discharge port 34 as well as an axially extending discharge port 2a. Therefore, the liquid can be discharged not only in the direction shown by the arrows M but also in the direction shown by the arrow N when the discharge port 2a is plugged. Thus, the liquid can be discharged either axially or radially as desired.

Figure 8:
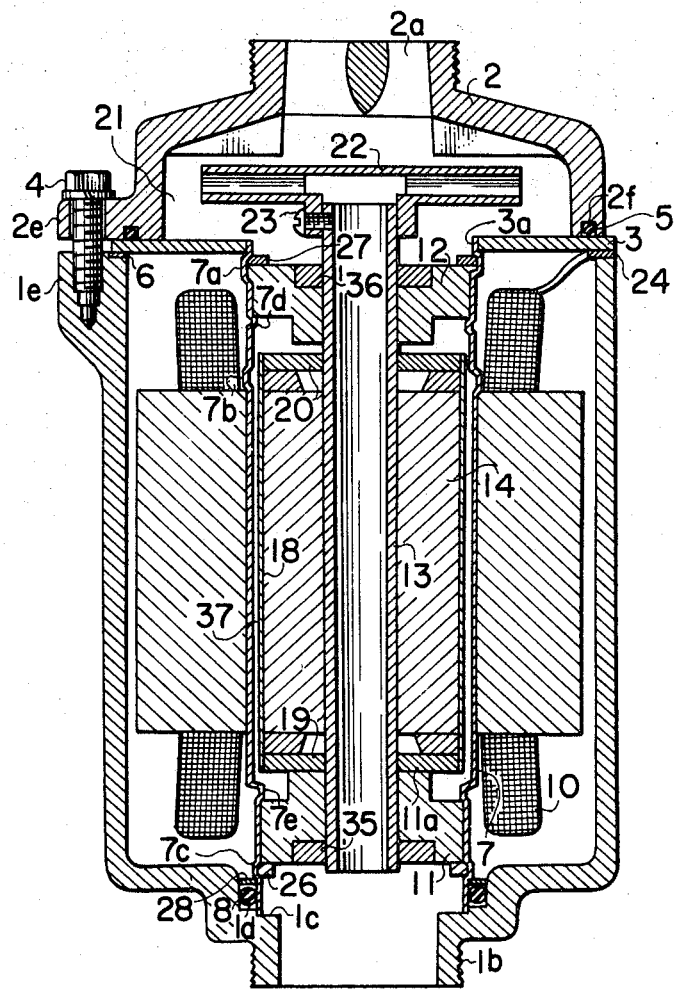
FIGS. 8 and 9 show longitudinal sectional views of motor driven pump in accordance with further embodiments of the present invention.

In FIG. 8 which shows another embodiment of the present invention, the reference numerals 35 and 36 show shaft seals provided on the bearing blocks 11 and 12, and 37 shows a rotor chamber defined by the bearing blocks 11 and 12 for filling a lubricating liquid which serves to lubricate the interfaces between the bearing blocks 11 and 12 and the hollow rotor shaft 13. This arrangement is effective to prevent bearing wear or rotor sticking due to the existence of foreign materials in the liquid and also effective to prevent lowering in performance or decrease in life.

Figure 9:
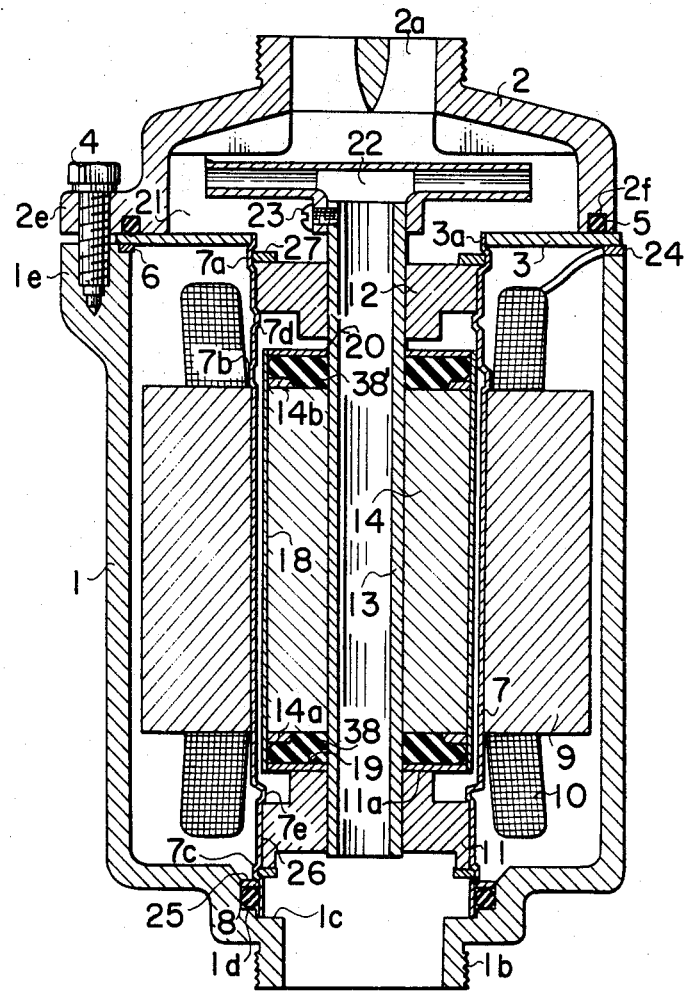

In FIG. 9 which shows a further embodiment of the present invention, the reference numerals 38 and 38' show resilient materials such as rubber for sealing the rotor core and inserted into a space defined by an end plate 19, the rotor core 14, the rotor core enclosure 18 and the hollow rotor shaft 13, and another space defined by an end plate 20, the rotor core 14, the rotor core enclosure 18 and the hollow rotor shaft 13. By this arrangement, the rotor can be sealed without requiring to connect the rotor core enclosure 18 and the end plates 19 and 20 such as by welding. The sealing effect obtained by this arrangement is the same as that obtained in the previous embodiments. The reference numerals 14a and 14b show end rings.

In the embodiment shown in FIGS. 10 and 11, the reference numerals 39 and 39' are filters such as wire screens mounted on the opposite ends of the bearing blocks 11 and 12. The filter 39 is secured between the bearing block 11 and the shield plate 25, while the filter 39' is secured between the bearing block 12 and the retaining ring 27 at the projecting edge 7a of the sleeve 7. Thus, by providing filter means at the circulation passage of the liquid for lubricating the bearings, problem of bearing wear or rotor sticking can be eliminated.

Figure 12:
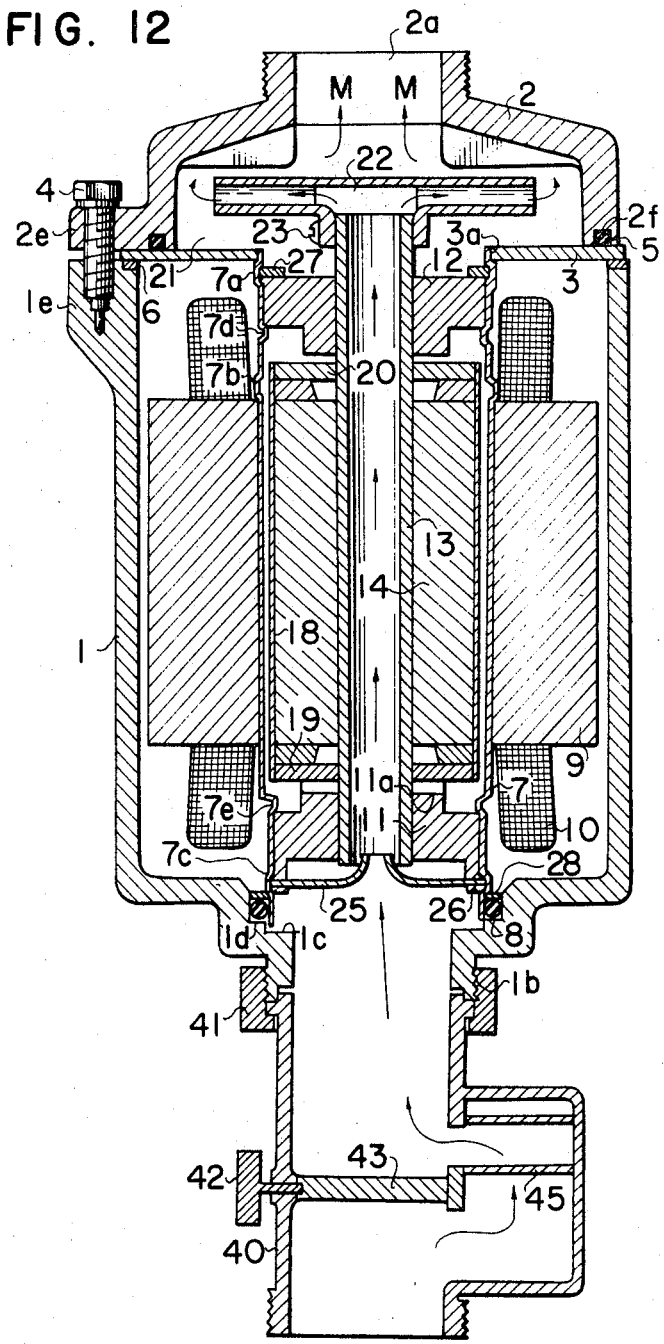
FIG. 12 is a longitudinal view of a motor driven pump showing another embodiment of the present invention.

In a further embodiment of the present invention shown in FIG. 12, the reference numeral 40 shows a filter case which is connected by means of a union 41 to the pipe connection 1b of the motor casing 1. The filter case 40 is provided in the main flow passage with a stop valve 43 interconnected with a handle 42. Further, the filter case 40 has a side flow passage 44 which by-passes the stop valve 43 and is provided with a filter 45. When the pump is newly installed, it is initially operated with the stop valve 43 in the filter case 40 closed. Thus, foreign materials which had entered conduits during plumbing are all screened by the filter 45. Thereafter, the stop valve 43 is partially opened by actuating the handle 42 to adjust the amount of water flow. The filter case 40 is removably connected to the conduit by the union 41. Therefore, any problem of bearing wear or rotor sticking due to foreign materials can be eliminated. Further, the amount of flow can be adjusted as desired through the adjustment of the stop valve 43.

What is claimed is:

1. A motor driven pump comprising a cylindrical sleeve having one end water tightly secured to an intake part of a motor casing, bearing blocks mounted on the inner surface of said sleeve at the opposite ends of the sleeve, a hollow rotor shaft for the motor supported by said bearing blocks, a pump impeller secured to the discharge end of said hollow rotor shaft, said discharge end projecting into a pump casing, a stator core for the motor mounted on the outer surface of said sleeve, an annular end plate having an inner periphery water tightly secured to the other end of said sleeve and an outer periphery water tightly held between an outer periphery of an open end face of said motor casing and an outer periphery of open end face of said pump casing, and a main liquid flow passage defined by the hollow interior of said hollow rotor shaft.

2. A motor driven pump in accordance with claim 1 in which a recirculation passage is formed in said cylindrical sleeve to allow the liquid propelled by the pump impeller to return through the outer and inner peripheries of the bearing blocks into the intake end of said hollow rotor shaft.

3. A motor driven pump in accordance with claim 1 in which the stator core of the motor is supported only by said cylindrical sleeve with the intervention of an electric insulating layer formed on the outer surface of the sleeve.

4. A motor driven pump in accordance with claim 1 in which the pump casing is provided at the center of its end surface with a discharge port for discharging the liquid, and pump guide vanes are provided for directing the liquid from inner periphery of the casing toward the discharge port.

5. A motor driven pump in accordance with claim 1 in which the pump casing is provided at the center of its end surface with a discharge port for discharging the liquid, and the pump further comprises pump guide vanes for directing the liquid from inner periphery of the pump casing toward said dischargre port, and adjusting vanes for making the liquid flow smooth at the discharge port.

6. A motor driven pump in accordance with claim 1 which further comprises a disc shaped foreign material shield plate having at the center portion a projection with an outer diameter smaller than the inner diameter of said hollow rotor shaft and with a central opening, said shield plate being secured to the intake end of the sleeve or the intake side of the motor casing, said projection being at least partially inserted into the hollow rotor shaft.

7. A motor driven pump in accordance with claim 1 which further comprises a slidable disc which is secured to the hollow rotor shaft and which is in slidable relation with respect to the end face of the bearing blocks adjacent to the pump impeller, the hollow rotor shaft being formed at a position between said slidable disc and the pump impeller with a hole passing through its wall.

8. A motor driven pump in accordance with claim 1 in which the pump casing is provided at the center portion of its end face with an axial discharge port and at the outer peripheral surface with a radial discharge port, pump guide vanes being provided adjacent to the inner peripheral surface of the pump casing.

9. A motor driven pump in accordance with claim 1 in which said bearing blocks are provided with shaft seals, and lubrication liquid is housed in a rotor chamber.

10. A motor driven pump in accordance with claim 1, which further comprises end plates secured to the opposite end faces of the rotor core which is mounted on the hollow rotor shaft, and a rotor core enclosure disposed around the rotor core and connected such as by welding to the outer peripheries of said end plates so as to sealingly enclose said rotor core.

11. A motor driven pump in accordance with claim 1 which further comprises filters disposed at the opposite end faces of the bearing blocks.

12. A motor driven pump in accordance with claim 1 in which the stator core of the motor is supported only by the cylindrical sleeve with the intervention of an electrical insulating layer formed on the outer surface of the sleeve, and which further comprises a foreign material shield plate mounted at the intake end of said sleeve, end plates provided at the opposite end faces of the rotor core secured to the hollow rotor shaft, an enclosure disposed around the rotor core so as to seal the rotor core, a discharge port provided at one end for discharging the liquid in the axial direction of said hollow rotor shaft, an adjusting vanes provides in the discharge port for making the liquid smooth, and pump guide vanes for directing the liquid from inner periphery of the pump casing toward said discharge port.

References Cited

UNITED STATES PATENTS

| | | | |
|---|---|---|---|
| 2,263,719 | 11/1941 | Davies | 417—371 |
| 2,524,269 | 10/1950 | Patterson | 417—357 X |

ROBERT M. WALKER, Primary Examiner

U.S. Cl. X.R.

310—61; 417—371, 423

UNITED STATES PATENT OFFICE
CERTIFICATE OF CORRECTION

Patent No. 3,667,870                  Dated June 6, 1972

Inventor(s) Yuji YOSHIDA et al

It is certified that error appears in the above-identified patent and that said Letters Patent are hereby corrected as shown below:

In the Claim for Convention Priority, two of the 10 Japanese applications upon which priority is based are missing and should be added as follows:

Japan, Patent Appln. N° 14683/70 filed February 19, 1970; and
Japan, Patent Appln. N° 14909/70 filed February 20, 1970.

Signed and sealed this 9th day of January 1973.

(SEAL)
Attest:

EDWARD M. FLETCHER, JR.                  ROBERT GOTTSCHALK
Attesting Officer                            Commissioner of Patents